(12) United States Patent
Sellers et al.

(10) Patent No.: US 10,919,418 B2
(45) Date of Patent: Feb. 16, 2021

(54) CAR SEAT WITH BELT GUIDE

(71) Applicant: Wonderland Switzerland AG, Steinhausen (CH)

(72) Inventors: Gregory Sellers, Christiana, PA (US); Curtis M. Hartenstine, Birdsboro, PA (US)

(73) Assignee: Wonderland Switzerland AG, Steinhausen (CH)

( * ) Notice: Subject to any disclaimer, the term of this patent is extended or adjusted under 35 U.S.C. 154(b) by 66 days.

(21) Appl. No.: 16/384,897

(22) Filed: Apr. 15, 2019

(65) Prior Publication Data

US 2019/0322196 A1  Oct. 24, 2019

Related U.S. Application Data

(60) Provisional application No. 62/659,355, filed on Apr. 18, 2018.

(51) Int. Cl.
*B60N 2/42* (2006.01)
*B60N 2/28* (2006.01)

(52) U.S. Cl.
CPC ......... *B60N 2/2806* (2013.01); *B60N 2/2863* (2013.01); *B60N 2/2872* (2013.01); *B60N 2/2884* (2013.01); *B60N 2002/2818* (2013.01)

(58) Field of Classification Search
CPC .. B60N 2/2884; B60N 2/2872; B60N 2/2863; B60N 2/2806; B60N 2002/2818; B60N 2/2803; B60N 2/28; B60N 2/2809
USPC ........ 297/216.11, 464, 483, 253, 468, 250.1, 297/475, 474, 473, 486, 238
See application file for complete search history.

(56) References Cited

U.S. PATENT DOCUMENTS

| 4,718,722 | A | | 1/1988 | Kassai | |
|---|---|---|---|---|---|
| 4,874,203 | A | * | 10/1989 | Henley | A61G 5/00 297/250.1 |
| 5,052,750 | A | * | 10/1991 | Takahashi | B60N 2/2821 297/256.13 |
| 5,842,740 | A | * | 12/1998 | Lefranc | B60N 2/2806 297/250.1 |
| 6,509,653 | B2 | * | 1/2003 | Fujimoto | B60R 21/01516 180/273 |
| 7,387,315 | B2 | * | 6/2008 | Nett | B60N 2/2806 24/598.2 |
| 10,632,870 | B1 | * | 4/2020 | Radion | B60N 2/265 |
| 2010/0123342 | A1 | * | 5/2010 | Mostert | B60N 2/2863 297/256.13 |
| 2011/0109137 | A1 | * | 5/2011 | Tamanouchi | B60N 2/2827 297/250.1 |
| 2014/0132045 | A1 | * | 5/2014 | Brady | B60N 2/2866 297/188.11 |

(Continued)

FOREIGN PATENT DOCUMENTS

FR   2 658 458 A1   8/1991

*Primary Examiner* — Chi Q Nguyen
(74) *Attorney, Agent, or Firm* — Winston Hsu

(57) ABSTRACT

A car seat with belt guide disposed at the side of the seat shell is for redirecting the shoulder belt when the car seat is installed on the vehicle seat, passed and fastened by the seat belt of the vehicle seat. The redirection of shoulder belt improves the symmetry of forces encountered by the vehicle seat and also improves the kinetics of the car seat during a crash. A break-away feature in the belt guide advantageously absorbs forces at different times during a crash.

11 Claims, 12 Drawing Sheets

(56) References Cited

U.S. PATENT DOCUMENTS

| | | | |
|---|---|---|---|
| 2015/0183341 A1* | 7/2015 | Carpenter | B60N 2/2803 |
| | | | 297/256.16 |
| 2016/0023579 A1* | 1/2016 | Balensiefer, II | B60N 2/2806 |
| | | | 297/256.15 |
| 2016/0264025 A1 | 9/2016 | Sumroy | |
| 2017/0120783 A1 | 5/2017 | Denbo | |
| 2019/0217751 A1* | 7/2019 | Kaiser | B60N 2/2824 |
| 2020/0101875 A1* | 4/2020 | Kim | B60N 2/2803 |

* cited by examiner

CAR SEAT WITH BELT GUIDE

CROSS REFERENCE TO RELATED APPLICATIONS

This application claims the benefit of U.S. Provisional Application No. 62/659,355, which was filed on Apr. 18, 2018, and is incorporated herein by reference.

BACKGROUND OF THE INVENTION

1. Field of the Invention

The invention relates to a car seat used to protect children during transport within a vehicle, and more particularly, to a car seat designed to accommodate younger children in the rearward facing direction.

2. Description of the Prior Art

There are many different designs used for rearward facing car seats and convertible car seats, but all have similar goals. The primary goal of every car seat is to keep its young occupant as safe as possible, especially in the case of a vehicular accident. To accomplish this, many designs strive to reduce the forces a child may experience during a crash. How this is achieved varies greatly among designs.

Some designs rely on one focal location, determined by how the vehicle belts interact with the car seat, to absorb unwanted forces. Vehicles that use the lap belt alone to secure the car seat typically apply symmetrical forces to the occupant in the event of vehicle collision. Vehicles with both a lap belt and a shoulder belt can present a challenge to the design of car seats because the angled shoulder belt inherently creates an asymmetrical distribution of forces that can interact with the occupant differently. To counteract this asymmetry, many designs include features that may increase the weight, complexity, and unsightly features of the car seat.

SUMMARY OF THE INVENTION

It is an objective to provide a safe environment for its occupant by redirecting the forces of the vehicle shoulder belt advantageously away from the occupant.

The invention features a deviation of the vehicle shoulder belt that is aesthetically subtle while remaining effective and the ability to reduce the forces experience by an occupant without significantly increasing the weight or complexity of the car seat.

It is also an objective to improve the symmetry of force distribution on the car seat through a redirection of the vehicle shoulder belt. The inherent asymmetry of the vehicle shoulder belt is mitigated by creating a new path for it on the car seat.

It is also an objective to provide a car seat that can reduce the forces experience by the occupant in the lateral direction and also reduce load applied to the focal belt path opening on the car seat with reduced or simplified structural components needed at the belt path opening.

The invention also features a break-away design of rerouting the vehicle shoulder belt. This design makes it possible to absorb forces at different times throughout the event of a crash which leads to a more symmetrical distribution of forces on the car seat.

It is advantageous of the invention that the break-away design allows for initial force of a vehicular collision to be largely redirected by the features provided by the invention instead of relying solely on the car seat frame. The break-away design can be reset in the case of an accidental overload through normal use by the consumer.

The invention also features the symbiotic relationship of a break-away design and a permanent belt guide attachment. These attachments are encountered consecutively with a length of slack allowed after the initial break-away before the permanent attachment, or hard stop, is relied upon.

According to an embodiment of the invention, a car seat with belt guide is configured to be fastened to a vehicle. The vehicle includes a vehicle seat having a retractor at a shoulder part, a receiver at a first waist part diagonal to the shoulder part, and a seat belt extending from the retractor and fixed to a second waist part opposite to the first waist part. The seat belt includes a shoulder belt and a lap belt connected to each other via a buckle. The shoulder belt extends from the retractor and is connected to the lap belt and the lap belt is further connected to the second waist part. The car seat includes a seat shell and a belt guide. The seat shell has a first side and a second side opposite to each other and also has a belt path connecting to both the first side and the second side. The belt guide is disposed at the first side of the seat shell and is neighboring the belt path for redirecting the shoulder belt. The shoulder belt includes a first section and a second section and when the car seat is fastened to the vehicle seat, the lap belt and the second section of the shoulder belt go through the belt path with the buckle locked by the receiver. The first section of the shoulder belt is coupled by the belt guide and redirected to have orientation deviated from an original path connecting directly between the retractor and an inlet of the belt path at the first side.

According to the embodiment of the invention, the belt guide is fixed at the first side of the seat shell and is located above the original path with one end. An open channel is formed between the other end of the belt guide and the seat shell. The first section of the shoulder belt may be slipped in the open channel and redirected by the belt guide to deviate from the original path toward a backrest of the vehicle seat.

According to an embodiment of the invention, the belt guide is a rigid structure made by injection molding.

According to an embodiment of the invention, the belt guide is anchored to the bottom of the seat shell via a webbing and is located at the first side of the seat shell between the inlet of the belt path at the first side and the bottom of the seat shell.

According to an embodiment of the invention, the belt guide includes a receiving slot and two support beams where a slit is formed between the two support beams and provided as a channel for the receiving slot. The first section of the shoulder belt may be slipped through the slit, contained in the receiving slot, and redirected by the belt guide to deviate from the original path toward the bottom of the seat shell.

According to an embodiment of the invention, the belt guide is made by injection molding where the two support beams provide a break-away structure breakable at a predetermined force.

According to an embodiment of the invention, the belt guide is a rigid structure with an open slot, wherein the first section of the shoulder belt is slipped and contained in the opened slot and redirected by the belt guide to deviate from the original path toward the bottom of the seat shell.

According to an embodiment of the invention, the webbing includes a rigid member connected to the bottom of the seat shell and a sacrificial sew line between the rigid member and the belt guide. The sacrificial sew line is breakable at a predetermined force to create a length of slack before a hard-stop is encountered.

According to an embodiment of the invention, the belt guide is made of metal.

According to an embodiment of the invention, the car seat further includes a sacrificial break-away tab fixed at the bottom of the seat shell. The webbing is sewed to the break-away tab to form a slack section between the break-away tab and a riveted end of the webbing. The break-away tab is breakable at a predetermined force to let out the slack section before a hard-stop is encountered.

According to an embodiment of the invention, the break-away tab is made by injection molded plastic and includes a notch cut in the center where the webbing is sewed to the center of the break-away tab.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
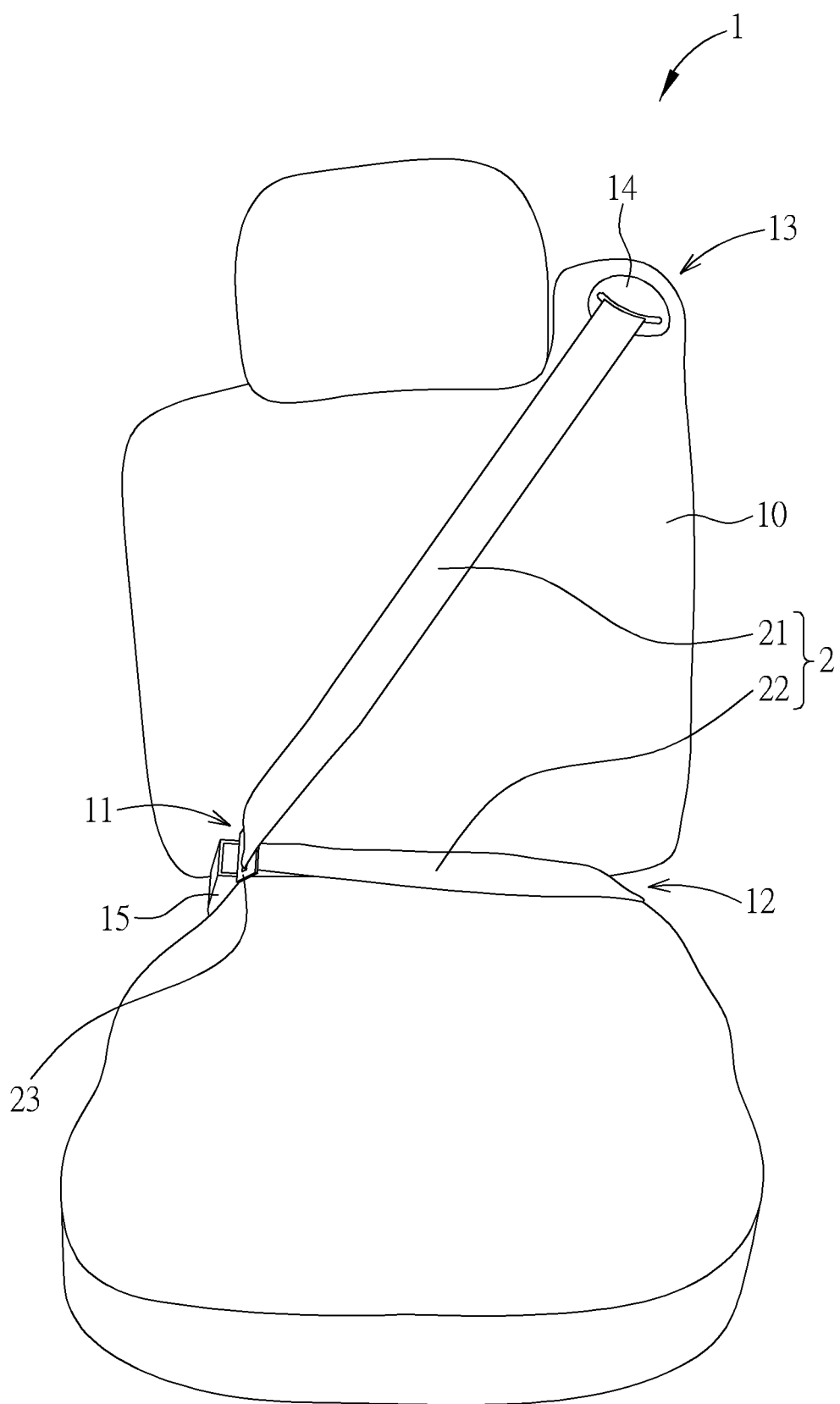
FIG. 1 is a front view of a vehicle seat with a seat belt.
Figure 2:
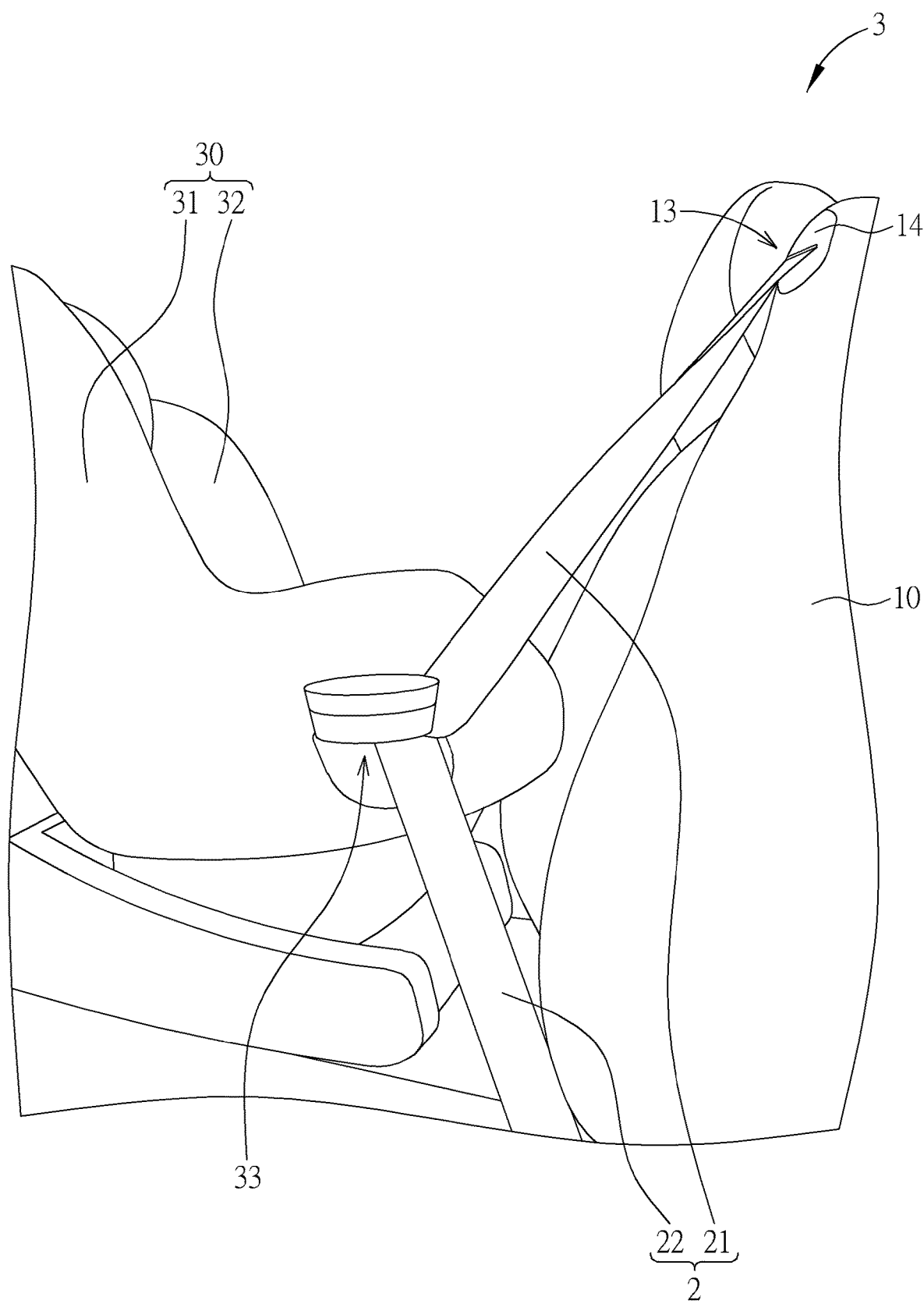
FIG. 2 is a side view of the vehicle seat in FIG. 1 fastening a car seat.

Please refer to FIG. 1 and FIG. 2. FIG. 1 is a front view of a vehicle seat with a seat belt and FIG. 2 is a side view of the vehicle seat in FIG. 1 fastening a car seat. The vehicle seat 1 of a vehicle is equipped with a three-point seat belt and has a retractor 14 at a shoulder part 13 of a backrest 10, a receiver 15 at a first waist part 11 of the backrest 10 diagonal to the shoulder part 13, and a seat belt 2 extending from the retractor 14 and fixed to a second waist part 12 of the backrest 10 opposite to the first waist part 11. The seat belt 2 has a shoulder belt 21 and a lap belt 22 connected to each other via a buckle 23. The shoulder belt 21 extends from the retractor 14 and is connected to the lap belt 22 and the lap belt 22 is further connected to the second waist part 12. The buckle 23 is provided to be locked by the receiver 15 so as to form the three-point configuration: from the shoulder part 13, the first waist part 11, and the second waist part 12 with the shoulder belt 21 extending across a passenger's front body and the lap belt 22 extending across the lap of the passenger. In FIG. 2, a car seat 3, whose seat shell 30 has a belt path 33 connecting to two opposite sides, a first side 31 and a second side 32, of the seat shell 30, is placed on the vehicle seat 1 and fastened to the vehicle seat 1 via the seat belt 2 goes through the belt path 33 with the buckle 23 received and locked by the receiver 15.

Figure 3:
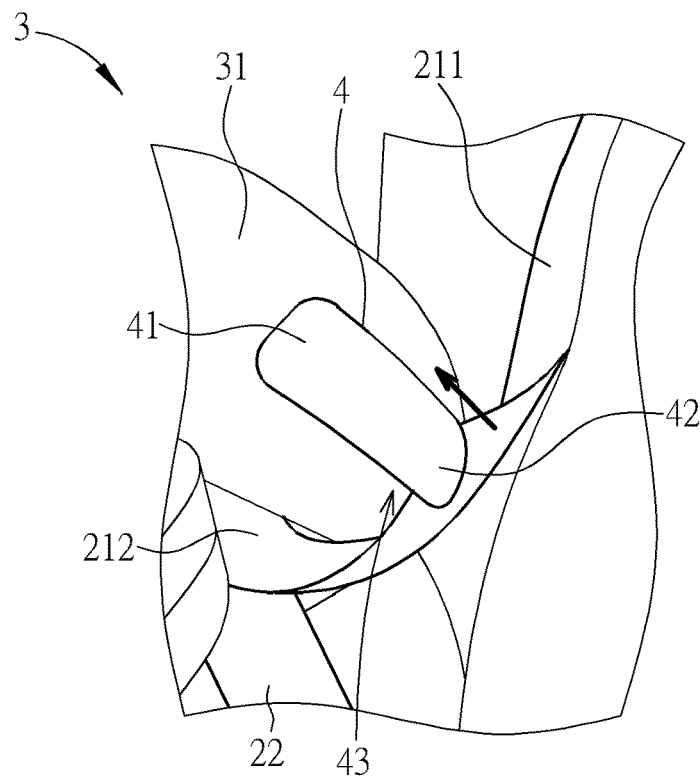
FIGS. 3-5 are illustrations showing a first embodiment of car seat with belt guide according to the invention.
Figure 4:
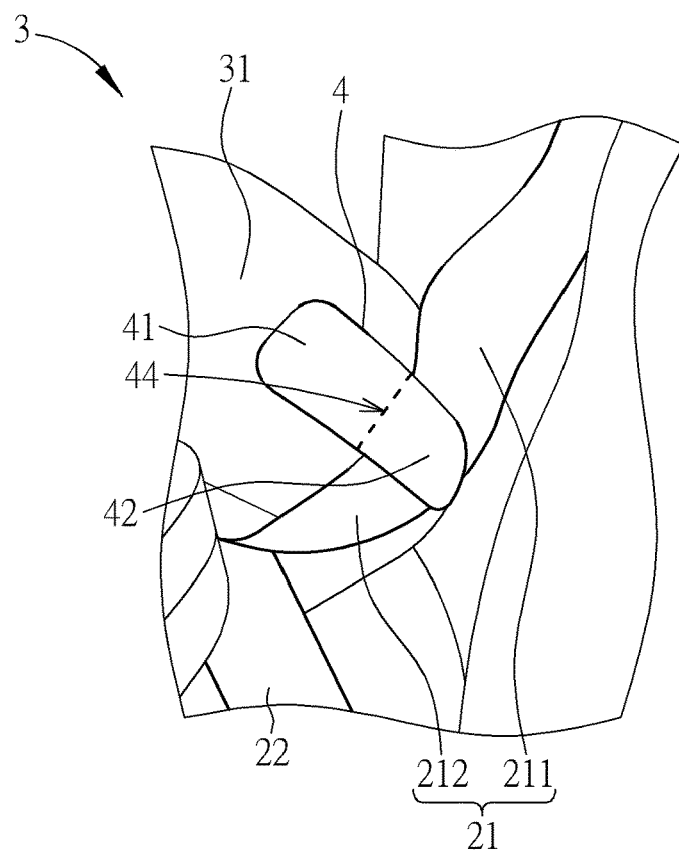
Figure 5:
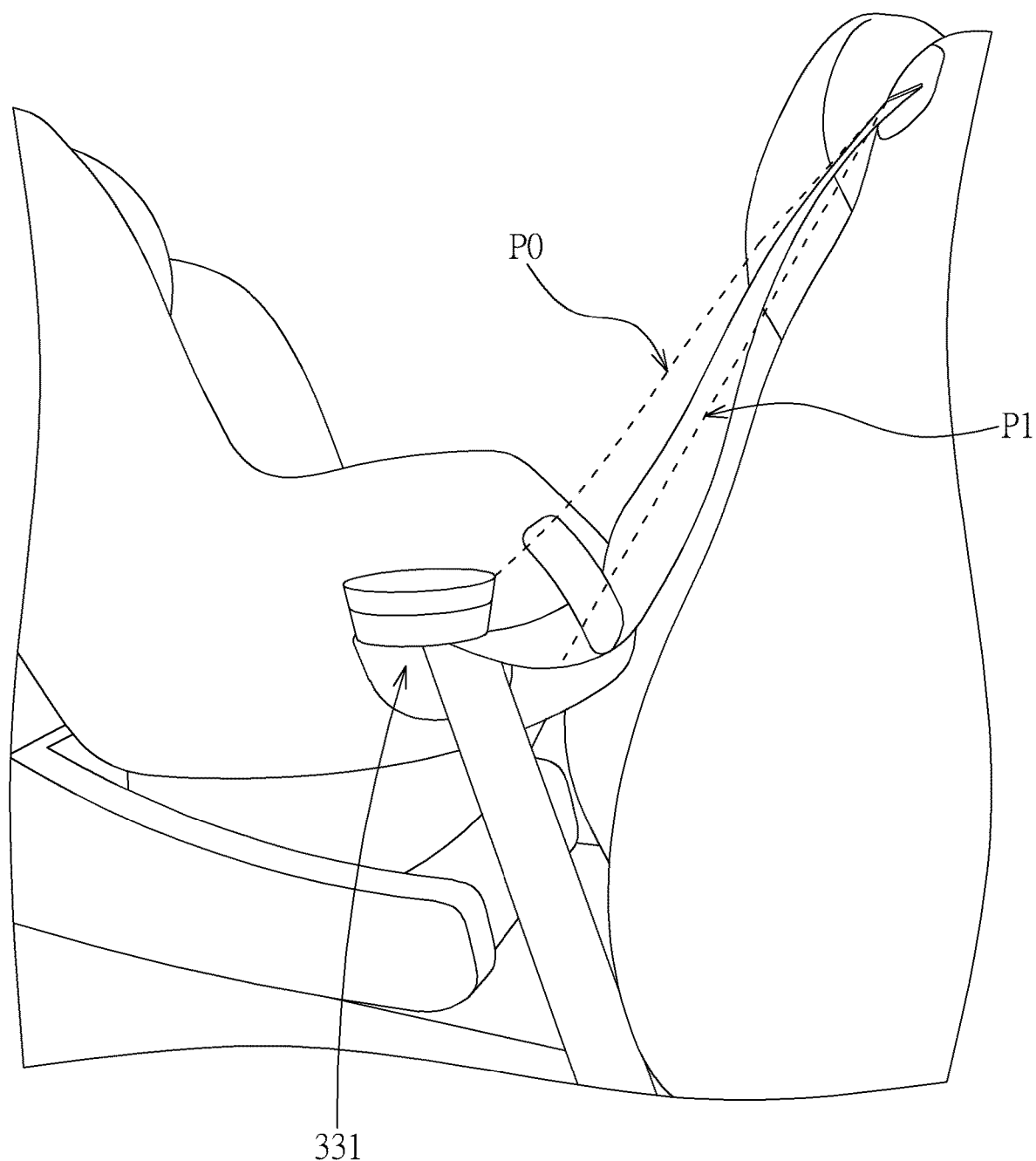
Figure 6:
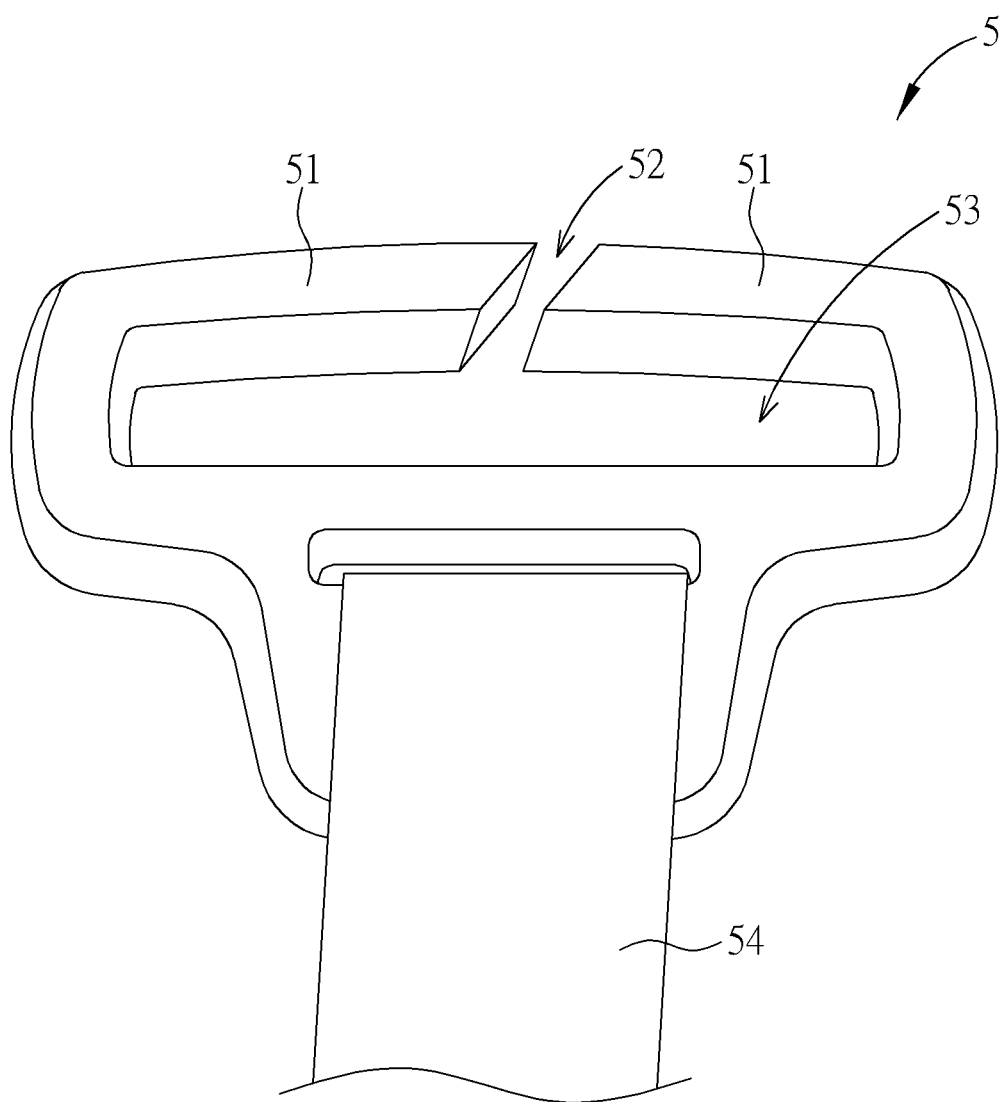
FIGS. 6-9 are illustrations showing a second embodiment of car seat with belt guide according to the invention.
Figure 7:
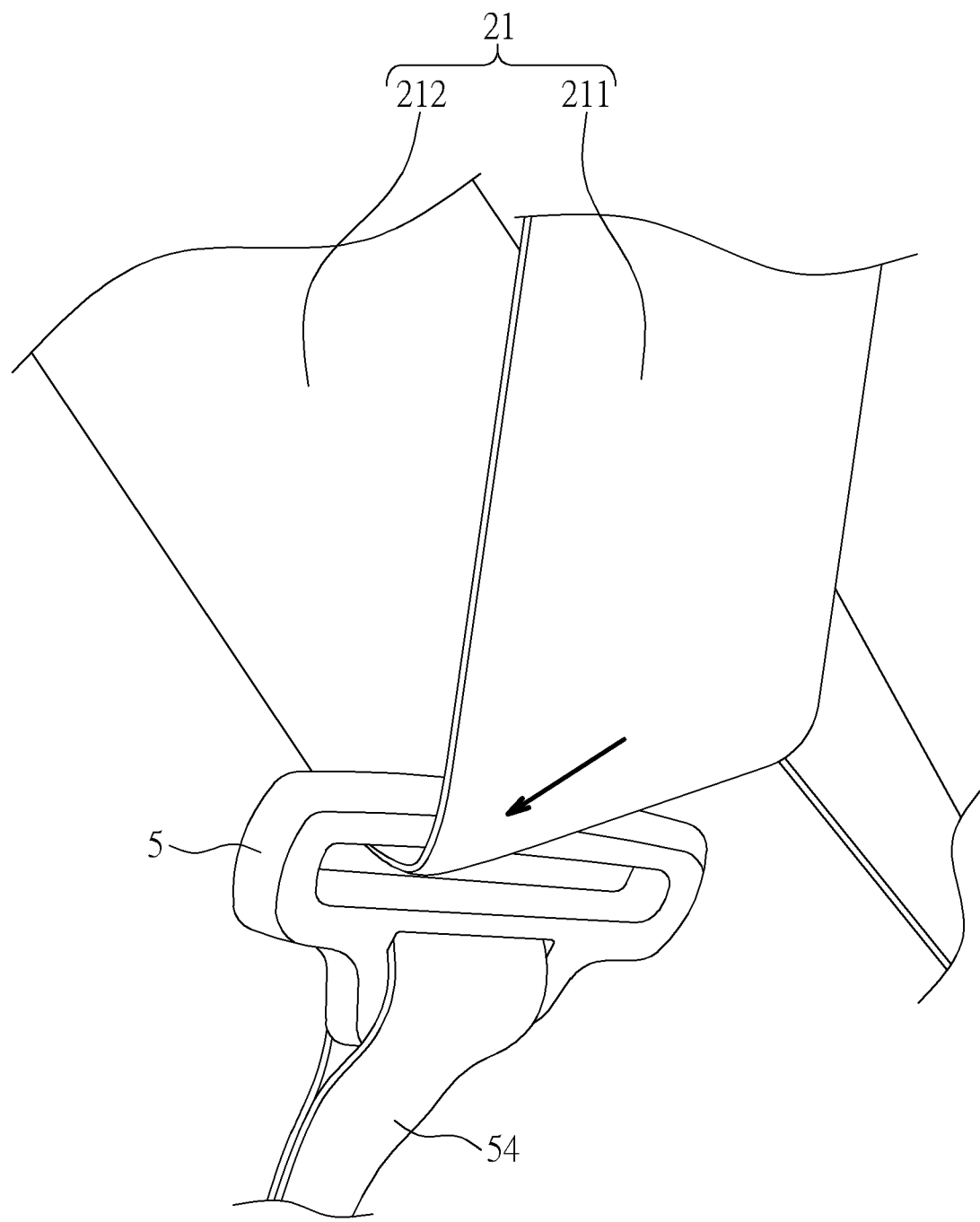
Figure 8:
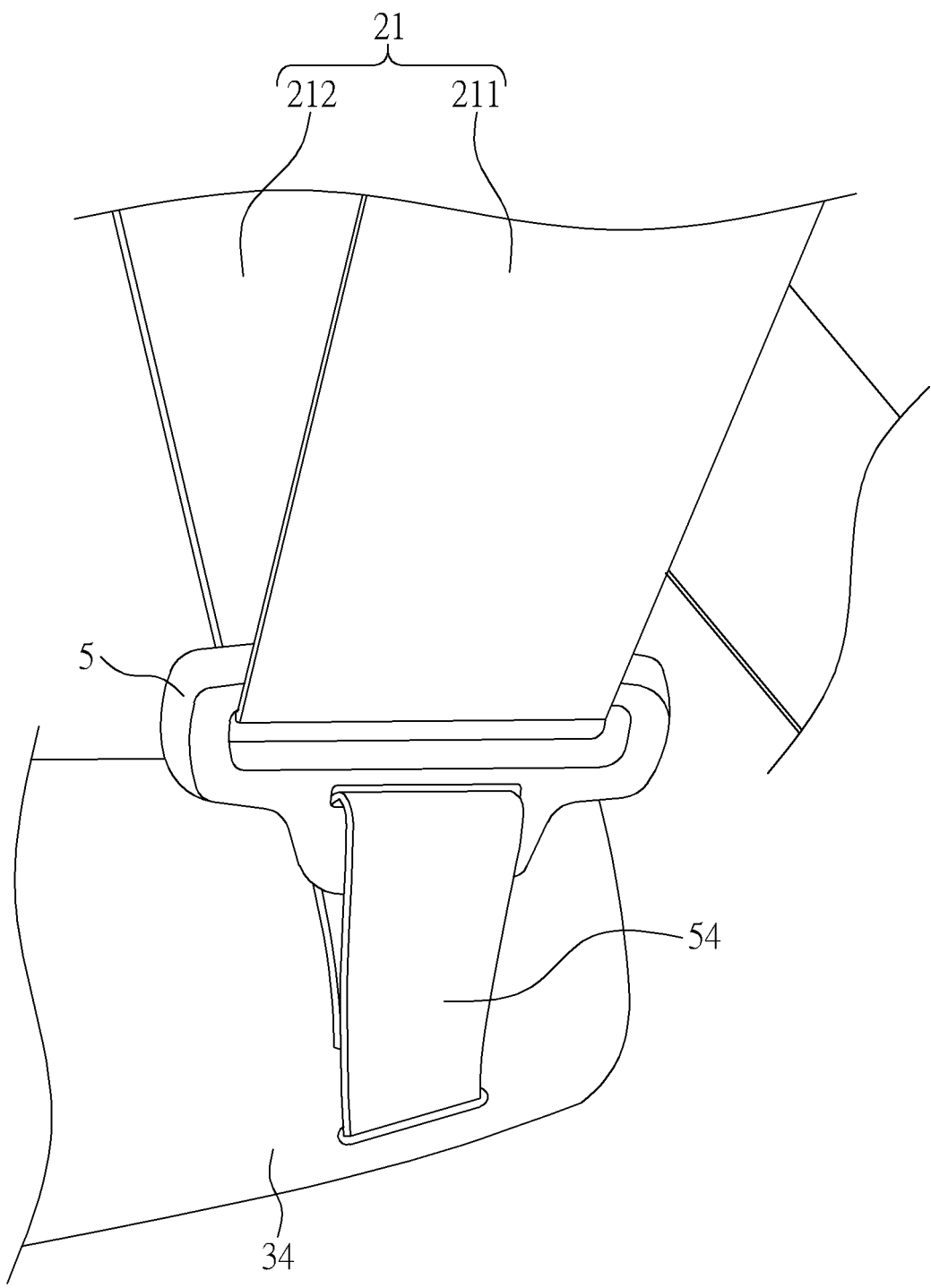

Please refer to FIG. 3 to FIG. 5, which are illustrations showing a first embodiment of car seat with belt guide according to the invention. The car seat 3 includes the seat shell 30 the same as what is depicted and described in FIG. 2, and a belt guide 4 disposed at the first side 31 of the seat shell 30 and neighboring the belt path (referring to FIG. 2) for redirecting the shoulder belt 21 away from its conventional path. In detail, the shoulder belt 21 as a portion of the seat belt 2, can be divided into a first section 211 and a second section 212 when used to fasten the car seat 3 along with the lap belt 22. The lap belt 22 along with the second section 212 goes through the belt path 33. The first section 211 extends from the retractor 14 and connects the second section 212 at an inlet 331 of the belt path 33 located at the first side 31 of the car seat 3. Regarding to a conventional fastening configuration, the first section 211 of the shoulder belt 21 extends from the retractor 14 to the inlet 331 following an original path P0 connecting directly between the retractor 14 and the inlet 331.

Referring to FIG. 3, the belt guide 4 of the first embodiment is fixed at the first side 31 of the seat shell 30 with one end 41 located above the original path P0 (referring to FIG. 5). An open channel 43 is formed between the other end 42 of the belt guide 4 and the seat shell 3, where the first section 211 of the shoulder belt 21 can be slipped in the open channel 43 (as shown in FIG. 3) until stopped by the end 41 at a stop location 44 (as shown in FIG. 4). For an exemplary embodiment, the plastic injection molded belt guide 4 changes/redirects the path of the first section 211 to deviate from the focal belt path, the original path P0, toward the backrest 10 of the vehicle seat 1 following a first path P1. When the shoulder belt 21 is slipped between the belt guide 4 and the seat shell 3, the belt guide 4 holds the first section 211 of the shoulder belt 21 forward towards the backrest 10 and out of alignment with the retractor 14. The belt guide 4 is a rigid structure that does not release the shoulder belt 21 in the event of a vehicular collision. Hence, the first embodiment of the invention improves the kinetics of the car seat 3 while maintaining an ease of installation. The user is only required to perform one simple step in addition to the tradition methods of installation.

Figure 9:
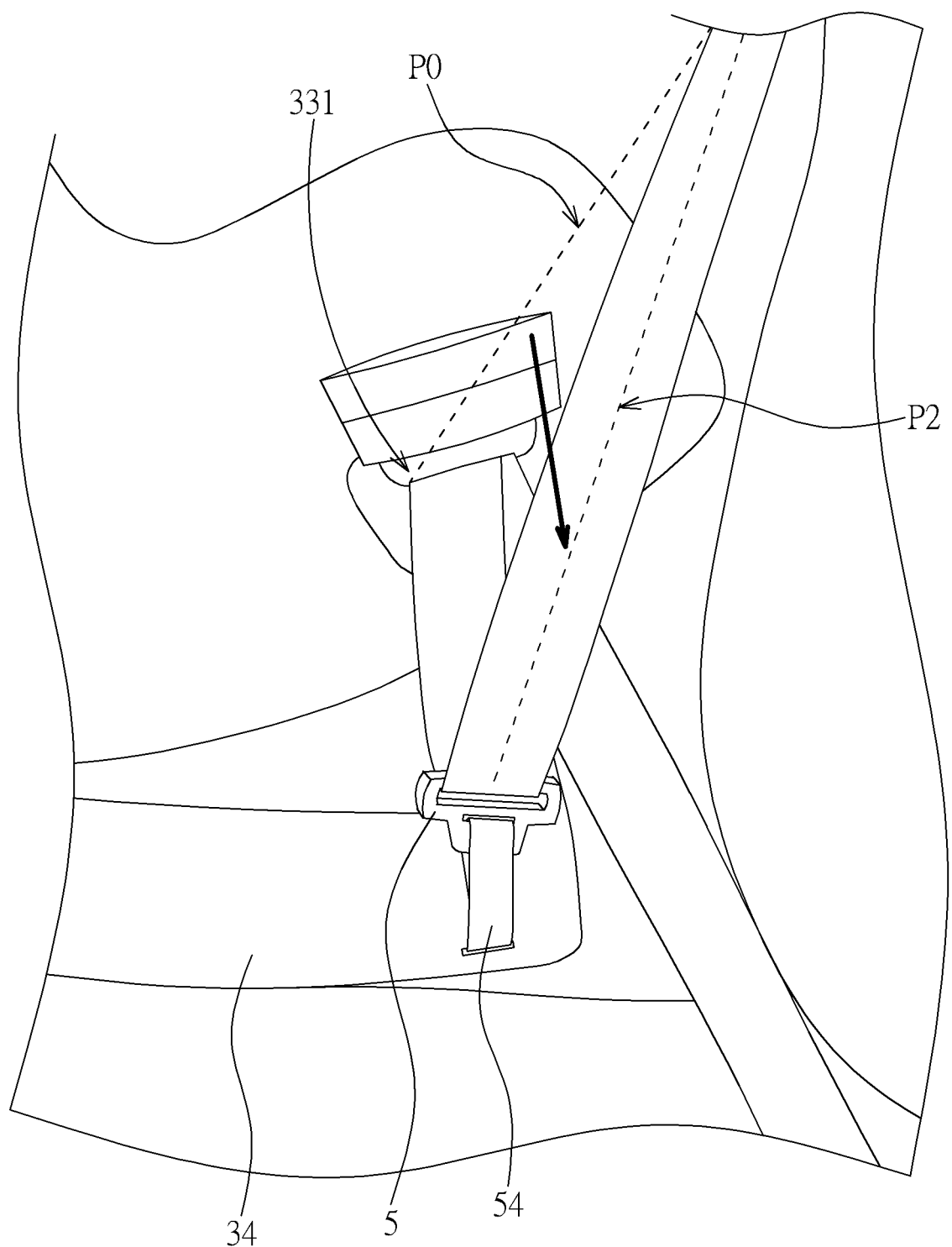
Figure 10:
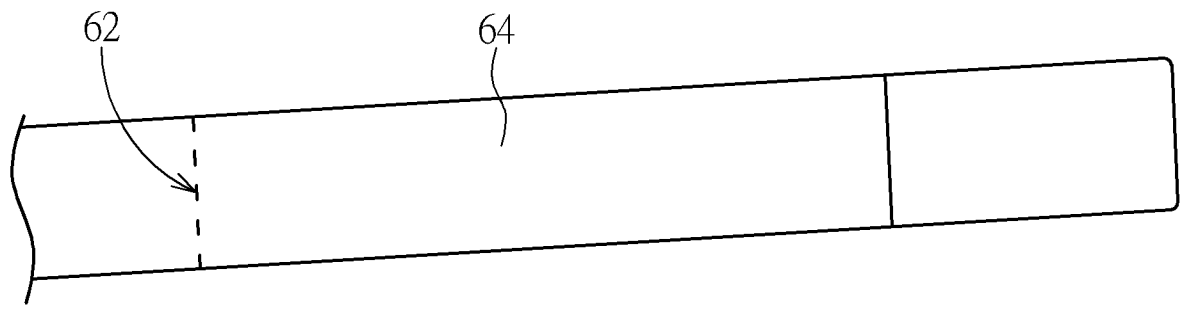
FIGS. 10-13 are illustrations showing a third embodiment of car seat with belt guide according to the invention.
Figure 11:
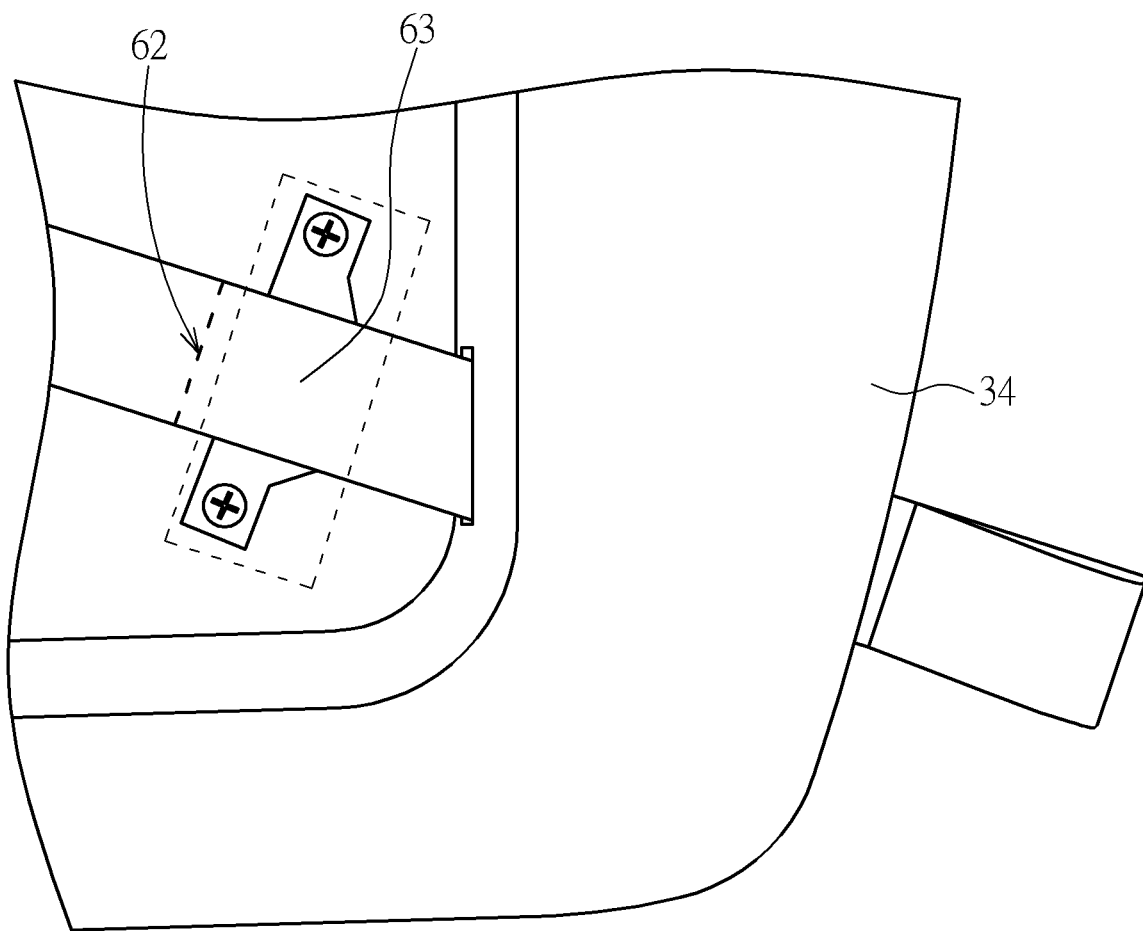
Figure 12:
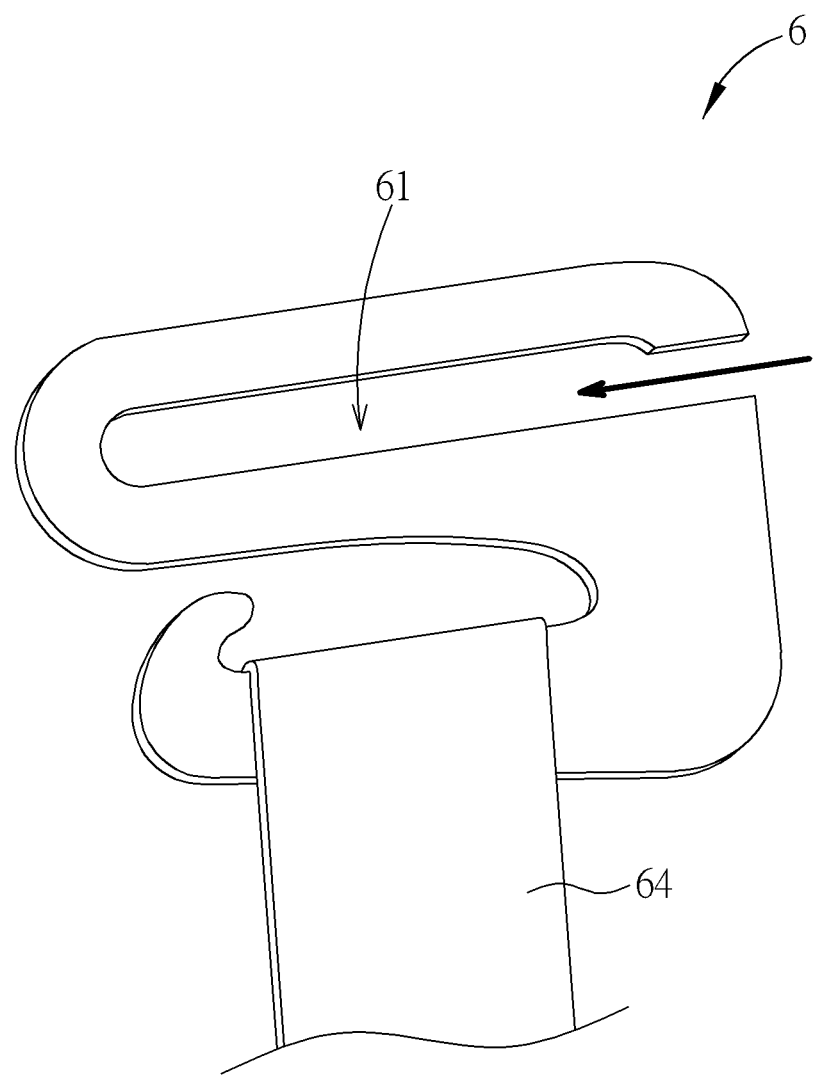
Figure 13:
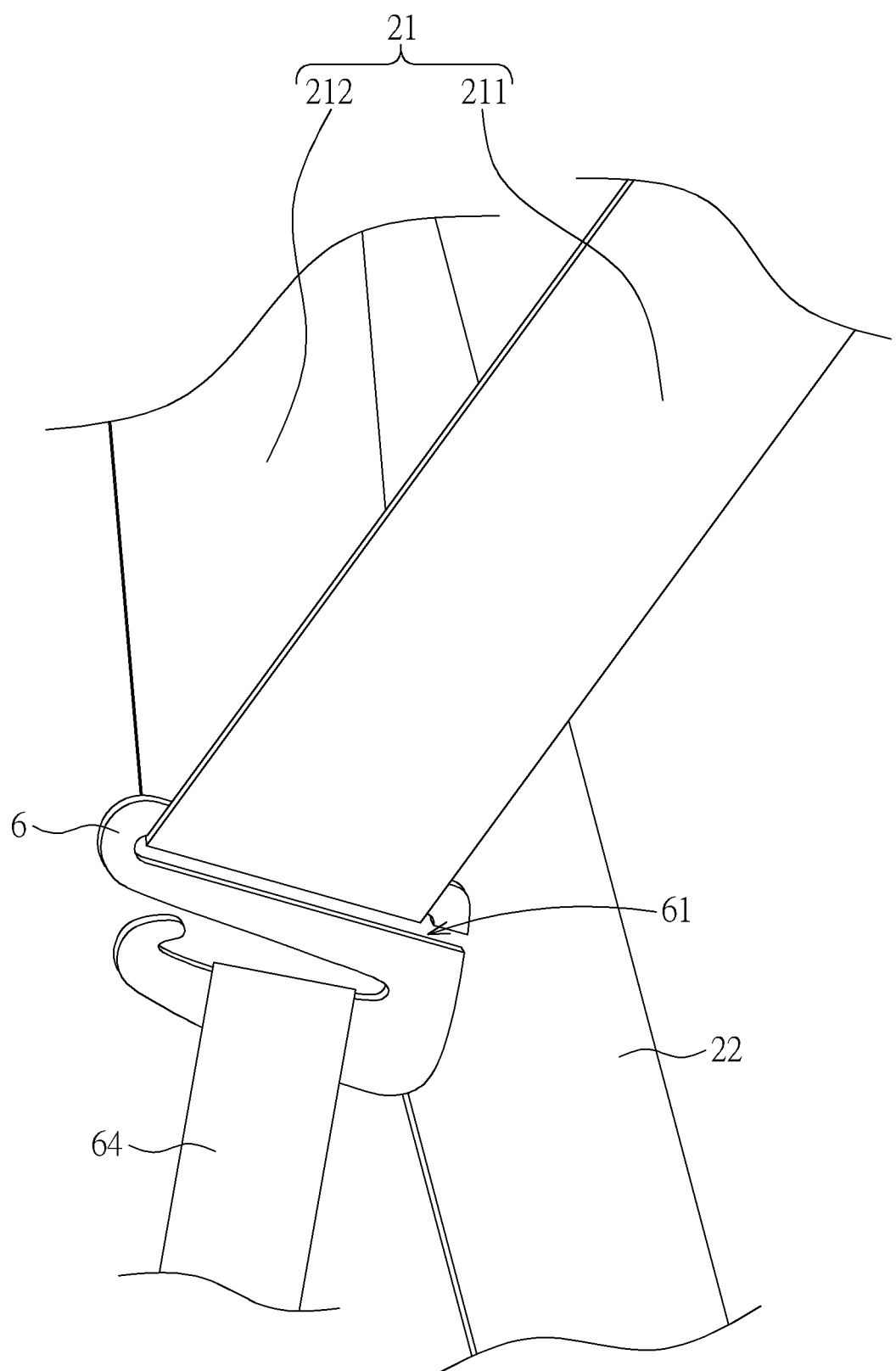

Please refer to FIG. 6 to FIG. 9, which are illustrations showing a second embodiment of car seat with belt guide 5 according to the invention. The second embodiment of the invention redirects the first section 211 of the shoulder belt 2 downward the original path P0 and toward the bottom 34 of the seat shell 30 where the first section 211 is deviated to follow a second path P2 as shown in FIG. 9. The belt guide 5 is a break-away structure made by plastic injection molding and is anchored to the bottom 34 of the seat shell 30 via a webbing 54. To redirect the first section 211 downward the original path P0, the belt guide 5 is located at the first side 31 of the seat shell 30 between the inlet 331 of the belt path 33 at the first side 31 and the bottom 34 of the seat shell 30. Please refer to FIG. 6. The belt guide 5 includes a receiving slot 53 and two support beams 51 where a slit 52 is formed between the two support beams 51 and provided as a channel for the receiving slot 53. During installation, the shoulder belt 21 and the lap belt 22 are threaded through the original belt paths in the same way as a traditional car seat, and the next step will be to place the first section 211, first slipping the first section 211 through the slit 52, into the redirecting receiving slot 53. The first section 211 can then be contained in the receiving slot 53 and redirected by the belt guide 5 to deviate from the original path P0 toward the bottom 34 of the seat shell 30 following the second path P2. In the second embodiment, the material and part geometry of the two support beams 51 of the belt guide 5 can be tuned to be breakable at a predetermined force, allowing the seat belt 2 to release during an accidental overload or a vehicular crash.

Please refer to FIG. 10 to FIG. 13, which are illustrations showing a third embodiment of car seat with belt guide 6 according to the invention. The third embodiment is similar to the previous embodiment by utilizing a sacrificial sew line. The belt guide 6 of the third embodiment is a rigid structure made of metal with an open slot 61. The first section 211 of the shoulder belt 21 is slipped and contained in the opened slot 61 that does not release the seat belt 2 during a crash. For the third embodiment, the first section 211 is also redirected by the belt guide 6 to deviate from the original path P0 toward the bottom 34 of the seat shell 30 following the second path P2 as referred in FIG. 9. The belt guide 6 is also anchored to the bottom 34 of the seat shell 30 via a webbing 64 where the webbing 64 includes a rigid member 63 connected to the bottom 34 and a sacrificial sew line 62 between the rigid member 63 and the belt guide 6. The sacrificial sew line 62 is tuned to have shape that is breakable at a predetermined force to create a length of slack before a hard-stop is encountered. The installation and benefits of this embodiment are comparable to the previous embodiment.

Figure 14:
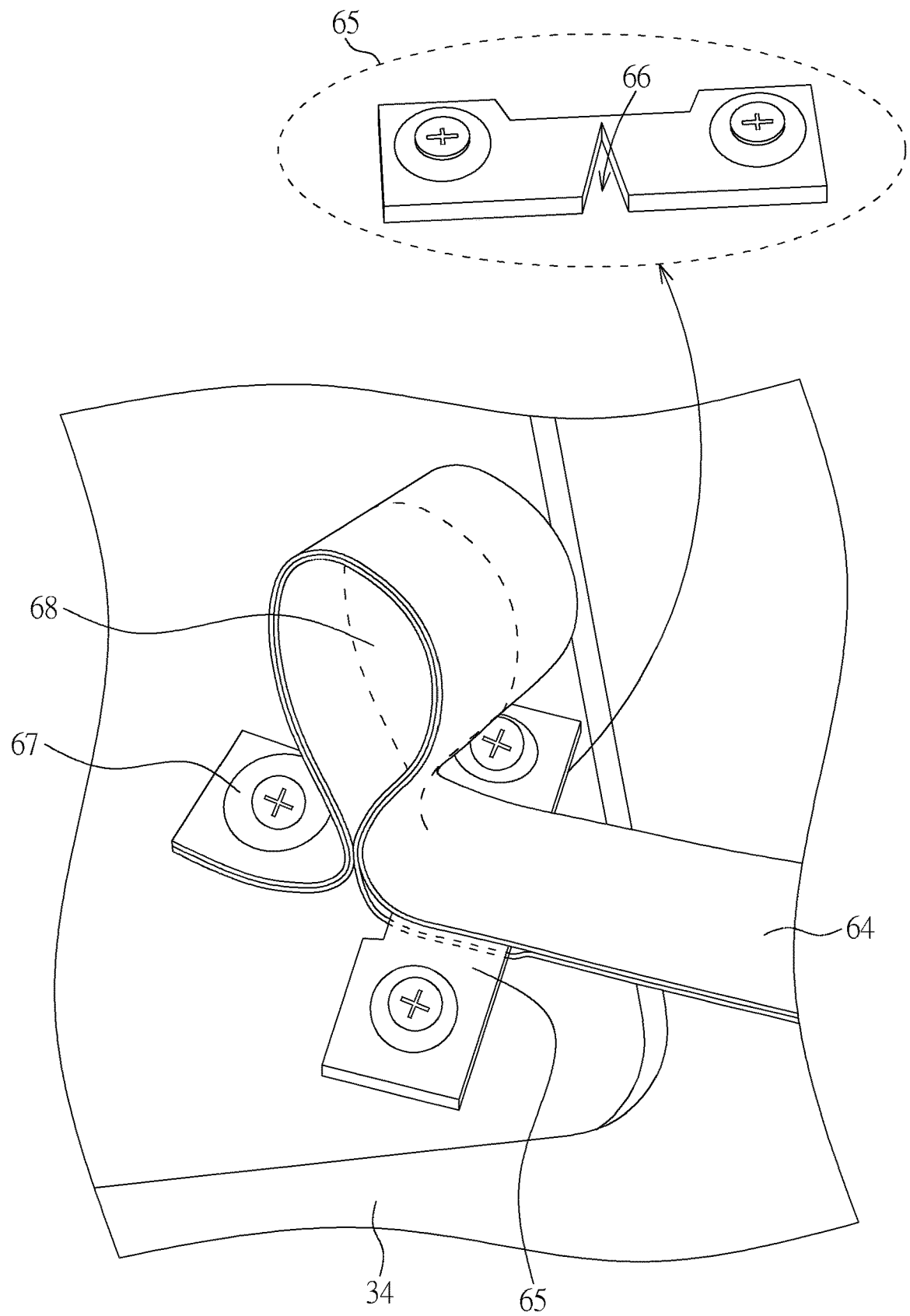
FIG. 14 is an illustration showing a fourth embodiment of car seat with belt guide 6 according to the invention.

Please refer to FIG. 14, which is an illustration showing a fourth embodiment of car seat with belt guide 6 according to the invention. The fourth embodiment utilizes the same ridged belt guide 6 from the third embodiment while integrating a sacrificial break-away tab 65. The break-away tab 65 is fixed at the bottom 34 of the seat shell 30, the webbing 64 is sewed to the break-away tab 65 to form a slack section 68 between the break-away tab 65 and a riveted end 67 of the webbing 64. The break-away tab 65 is made by injection molded plastic that has a notch 66 cut in the center where the webbing 64 is sewed to the center of the break-away tab 65. The notch 66 allows the plastic to break during a vehicular crash so that a length of the slack section 68 can be let out. After the slack section 68 is released, the riveted end 67 of the webbing 64 creates a hard-stop that does not allow any further extension of the webbing 64. The sacrificial break-away tab 65 can be tuned to be breakable at a predetermined force. In this way, the fourth embodiment has similar advantages and installation methods as the previous embodiment. The materials depicted in each embodiment of the invention can be changed to include other embodiments of similar construction.

The embodiments of the invention provide a car seat with belt guide disposed at the side of the seat shell for redirecting the shoulder belt when the car seat is installed on the vehicle seat, passed and fastened by the seat belt of the vehicle seat. The redirection of shoulder belt improves the symmetry of forces encountered by the vehicle seat and also improves the kinetics of the car seat during a crash. A break-away feature in the belt guide advantageously absorbs forces at different times during a crash. All the embodiments distribute the forces of impact so that they are not localized at the belt path.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A car seat with belt guide, configured to be fastened to a vehicle comprising a vehicle seat having a retractor at a shoulder part, a receiver at a first waist part diagonal to the shoulder part, and a seat belt extending from the retractor and fixed to a second waist part opposite to the first waist part, the seat belt comprising a shoulder belt and a lap belt connected to each other via a buckle, the shoulder belt extending from the retractor and connected to the lap belt and the lap belt further connected to the second waist part, the car seat comprising:
   a seat shell having a first side and a second side opposite to each other and having a belt path connecting to both the first side and the second side; and
   a belt guide disposed at the first side of the seat shell and neighboring the belt path for redirecting the shoulder belt;
   wherein the shoulder belt comprises a first section and a second section and when the car seat is fastened to the vehicle seat, the lap belt and the second section of the shoulder belt go through the belt path with the buckle locked by the receiver;
   wherein the first section of the shoulder belt is coupled by the belt guide and redirected to have orientation deviated from an original path connecting between the retractor and an inlet of the belt path at the first side.

2. The car seat with belt guide of claim 1, wherein the belt guide is fixed at the first side of the seat shell and located above the original path with one end and an open channel formed between the other end of the belt guide and the seat shell, the first section of the shoulder belt slipped in the open channel and redirected by the belt guide to deviate from the original path toward a backrest of the vehicle seat.

3. The car seat with belt guide of claim 2, wherein the belt guide is a rigid structure made by injection molding.

4. The car seat with belt guide of claim 1, wherein the belt guide is anchored to the bottom of the seat shell via a webbing and is located at the first side of the seat shell between the inlet of the belt path at the first side and the bottom of the seat shell.

5. The car seat with belt guide of claim 4, wherein the belt guide comprising a receiving slot and two support beams where a slit is formed between the two support beams and provided as a channel for the receiving slot, wherein the first section of the shoulder belt is slipped through the slit, contained in the receiving slot, and redirected by the belt guide to deviate from the original path toward the bottom of the seat shell.

6. The car seat with belt guide of claim 5, wherein the belt guide is made by injection molding where the two support beams provide a break-away structure breakable at a predetermined force.

7. The car seat with belt guide of claim 4, wherein the belt guide is a rigid structure with an open slot, wherein the first section of the shoulder belt is slipped and contained in the opened slot and redirected by the belt guide to deviate from the original path toward the bottom of the seat shell.

8. The car seat with belt guide of claim 7, wherein the webbing comprises a rigid member connected to the bottom of the seat shell and a sacrificial sew line between the rigid member and the belt guide, the sacrificial sew line being breakable at a predetermined force to create a length of slack before a hard-stop is encountered.

9. The car seat with belt guide of claim 7, wherein the belt guide is made of metal.

10. The car seat with belt guide of claim 7, wherein the car seat further comprises a sacrificial break-away tab fixed at the bottom of the seat shell, the webbing being sewed to the break-away tab to form a slack section between the break-away tab and a riveted end of the webbing, the break-away tab being breakable at a predetermined force to let out the slack section before a hard-stop is encountered.

11. The car seat with belt guide of claim 10, wherein the break-away tab is made by injection molded plastic and comprises a notch cut in the center where the webbing is sewed to the center of the break-away tab.

* * * * *